United States Patent [19]

Wommelsdorf et al.

[11] 4,124,434

[45] Nov. 7, 1978

[54] APPARATUS FOR LINING BY LAMINATION AIR-PERMEABLE CONTAINERS WITH THERMOPLASTIC SHEETING OR FILM

[75] Inventors: Fritz Wommelsdorf; Werner Schmidt, both of Hamburg, Fed. Rep. of Germany

[73] Assignee: Maschinenfabrik Rissen GmbH, Hamburg, Fed. Rep. of Germany

[21] Appl. No.: 735,774

[22] Filed: Oct. 26, 1976

[30] Foreign Application Priority Data

Oct. 25, 1975 [DE] Fed. Rep. of Germany ....... 2547814
Jun. 18, 1975 [DE] Fed. Rep. of Germany ....... 2627379

[51] Int. Cl.² .......................... B32B 27/10; B65D 5/56
[52] U.S. Cl. .................................... 156/475; 156/287; 156/293; 229/1.5 B; 264/269
[58] Field of Search ................... 156/84, 87, 156, 285, 156/286, 287, 293, 294, 306, 311, 322, 381, 382, 494, 498, 499, 556, 475; 264/209, 259, 269, 268, 101, 102; 229/1.5 B

[56] References Cited

U.S. PATENT DOCUMENTS

| | | | |
|---|---|---|---|
| 2,509,439 | 5/1950 | Langer | 156/311 |
| 2,559,573 | 7/1951 | Unwin | 211/125 |
| 2,736,065 | 2/1956 | Wilcox | 156/287 |
| 2,891,280 | 6/1959 | Politis | 229/1.5 B |
| 3,134,307 | 5/1964 | Loeser | 156/311 |
| 3,528,865 | 9/1970 | Amberg et al. | 156/287 |
| 3,697,369 | 10/1972 | Amberg et al. | 156/285 |
| 3,933,562 | 1/1976 | Cruckshank et al. | 156/287 |
| 3,957,558 | 5/1976 | Lee et al. | 156/287 |

Primary Examiner—David Klein
Assistant Examiner—John E. Kittle
Attorney, Agent, or Firm—Arnold, White and Durkee

[57] ABSTRACT

Apparatus for lining by lamination air-permeable containers with thermoplastic film involving a deep drawing operation. The containers are held in deep drawing molds formed in a rotating table and the film blanks are formed from a film web onto individual holding means secured to another rotating table, the driving means for the tables being synchronized such that the film blanks are timely presented for the deep drawing operation following heating. Each holding means includes a metallic frame having a plurality of closely spaced pins for penetrating a film blank around the area to be deep drawn, the pins causing the area to be relieved of stresses during heating and shrinkage and hence troublesome wrinkles in the blanks prior to being deep drawn. Surprisingly, the pins do not cause tearing of even very thin film, because of the head conductor property of the pins and its effect on the arcing of the film blank in the vicinity of the pins as the blank shrinks.

12 Claims, 7 Drawing Figures

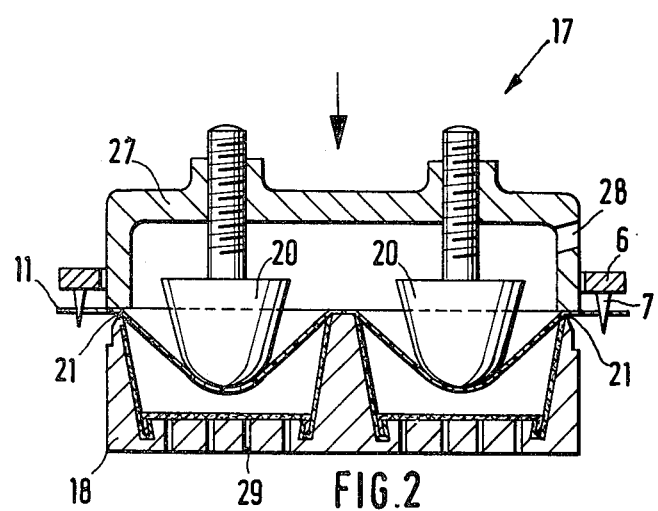
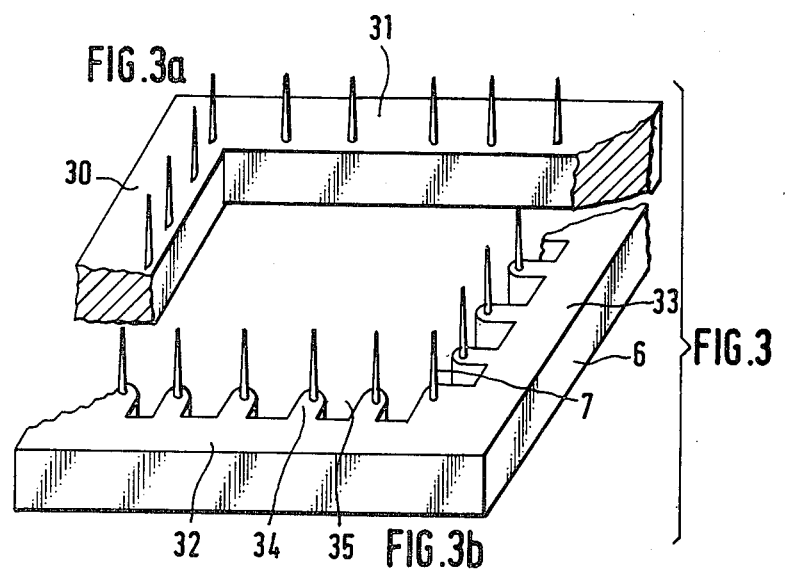

APPARATUS FOR LINING BY LAMINATION AIR-PERMEABLE CONTAINERS WITH THERMOPLASTIC SHEETING OR FILM

The manufacture of deep-drawn containers of thermoplastic film is rendered exceedingly difficult when use is being made of thin and soft films, e.g. polyethylene films having a thickness of less than 0.2 mm. In such a case the film possesses no appreciable internal strength to start with prior to the deep-drawing operation and, of course, a container deep-drawn from such films even less. However, such containers can be suitable when they are drawn or, if necessary, bonded into more rigid containers, such as paper cups.

Very thin films have an extremely strong tendency to shrink when they are heated. The thinner the films are, the greater becomes their inevitable elongation in the longitudinal direction of the film web during the manufacturing process. The frozen elongation stresses are liberated in a subsequent heating process and lead to the shrinkage tendency. The plastic films processed up to now in deep-drawing machines are thicker and do not possess such a marked tendency to shrink. However, when the very thin films are being processed in deep-drawing machines of the hitherto known type for mass-producing deep-drawn articles, then they shrivel so severely upon being heated due to the shrinkage effects that they cannot be conveyed to the deep-drawing station without wrinkles. In the majority of the machines according to the present state of the art the web of film, when being transported through the heating station into the deep drawing station, is merely held on both longitudinal sides, which is effected by the use of clamping frames or, frequently, by means of impalement on chain links having pointed edges. However, the shrinkage of thin films due to increasing heat takes place only in the longitudinal direction of the film webs, since it was in this direction that the webs had been drawn lengthwise during the manufacturing process. In this direction of action the conventional deep drawing machines lack all power to prevent the shrinkage from occurring or to hold the film tautly. Only once the film reaches the deep drawing station proper and is clamped in the same, is it possible to prevent additional shrinkage. But by then it is already too late since the film, which underwent severe shrivelling during the preceding heating operation, would reach the deep drawing station already covered with wrinkles and creases.

It is likewise impossible to clamp the film in order to avoid the undesirable shrinkage effect. A uniform clamping is practically out of question in the case of thin films due to unavoidable variations in the thickness of the film before the film is not warm enough as to be plastic. The shrinkage stresses occur in the heating operation before the film becomes plastic. For this reason it is impossible to achieve a perfect clamping, when minor irregularities exist in the film thickness, at a thicker point, whilst the film remains losse it may clamp at another; thinner point and is pulled or torn out of the clamping frame due to the action of the shrinkage stresses. Another reason why such a clamping frame is subject to frequent failure is the circumstance that the films become adherent under such strong clamping pressure at the temperature to be reached. This fouls the clamping connections or causes the film to stick fast to them.

It is the object of an present invention to provide an apparatus for lining containers which, at the same time, permits the processing of films having a strong tendency to shrink, in particular thin films.

The invention resolves this problem in that a device designed to prevent shrinkage and to maintain the film in a smooth state is provided. This device includes pins arranged essentially parallel to each other and perpendicular to the plane of the film, the pins being perpendicular thereto. The film is pierced by these pins, the pins being arranged in at least two rows that extend along opposite sides of the film area to be deep-drawn transversely to the shrinkage direction of the film. These rows of pins on to which the film is impaled in its original, that is to say, unshrunk state, remain spaced apart from each other at an invariable or a constant distance during the heating and deep-drawing process. By preference, the rows of pins are designed in such a way that they completely surround the film area to be deep-drawn. They are expediently arranged on a frame on which it is possible to advantageously impale individual portions of film appropriately cut to size corresponding to the film area to be deep-drawn.

This solution comes as a surprise as it had to be expected that the sensitive, extremely thin films would tear apart or tear at the edges where the points of puncture were located as soon as the shrinkage stresses and the deep-drawing stresses become effective there.

Moreover, it was to be feared that the films would adhere to the pins, particularly when these pins were provided, at the side which comes in contact with the container to be lined, with an agent, e.g. "HOT MELT", which, when approaching the deep-drawing temperature, becomes adhesive. However, the pin mounting according to the invention is suitable even for such instances of application in which the heat transmission cannot be concentrated on the area of the film portion or blank to be deep-drawn, and even when the margin of the film portion held by the pins is heated. When the film is heated, its frozen shrinkage stresses are liberated and the film tries to contract. It would have been expected that the soft marginal areas of the film would not be capable of resisting these shrinkage stresses and that the soft film margin would tear at the edges along the pins. In actual fact, it has been proved in practice that the soft film margin does contract in a series of arches or in an arcade-like manner due to the shrinkage stresses between the pins. Surprisingly, however, the film is completely prevented from shrinking in the area where it is held by the pins. It fully transmits the shrinkage stresses to the pins, but does not tear at the film edge along the pins. This effect has to be attributed to the circumstance that the pins, due to their heat emission to the apparatus component on which they are mounted, as a rule have a somewhat lower temperature than the softened film. A temperature gradient results in the softened (hotter) margin in the direction to the cooler margin portions adjacent to the pins, which causes an increase in the strength of the film portions or blanks. In that way, an ideal stress transmission comes into being from the soft film areas to the firmer film portions interacting directly with the pins. This also applies especially when the film portion due to be deformed is, according to the invention, cut out of the film web prior to the impalement. The following effect may then be utilized to the end that the pins fulfill their function to the fullest without the film being torn by them. In fact, the shrinkage of the cut-off film, as well as the contraction of the film margin between the pins results in the film material located, to begin with, further outside the pins, being drawn closer towards the pins and, in so doing, accumulating on these pins in a collar-like manner. Hence, the film strength within the pin area is additionally increased. Finally, a thickening of material also takes place on the margins of the arcade-like constrictions located between the pins, thus safeguarding these as well against a tearing at the edges. It is possible in this manner to securely hold in problem-free fashion even very thin films which shrink substantially when heated, as well as soft or adherent films, for which the hitherto known holding means have turned out to be unsuitable.

As a rule, in the case of apparatuses in which a plurality of pin carriers and deep-drawing tools are provided, no special steps have to be taken to maintain the pins at a somewhat lower temperature than the deep drawing temperature of the films as the pins, apart from the heating station, pass through other stations as well, and in which they cool off. It will often be advantageous, however, to fabricate them from metal and to mount them on the frame in a manner conducive to heat conduction. The frame is likewise fabricated from metallic material that possesses good heat conductivity. They may, by way of example, be mounted in an aluminium frame with a direct heat conducting contact. The heat emission from these pin areas on which the film is normally retained, and may be influenced by the appropriate selection of the thermal conductivity of the pins, the thickness of the pins and by the distance of these areas from the pin mounting in the frame. Transversely to the main direction of shrinkage of the film portions, the pins must not be spaced apart more than 15 mm. This distance is expediently between 5 and 15 mm within an area of 10 mm. If necessary, it is possible to have the pins spaced further apart in these areas where no significant shrinkage effect of the film is to be expected (i.e., parallel to the web edges).

It is expedient for the frame to be provided with cut-out sections between the pins to allow a stripping device to pass through which, by way of example, impinges in the manner of a comb upon the film areas located between the pins in order to draw the film margin off the pins.

Since, according to the invention, the films do not form part of a continuous web of film, difficulties may be encountered in processing the extremely thin and, consequently, very soft portions of film in the apparatus, particularly when transferring the film on to the pin frames. For this reason, it is an additional object of the invention to provide an apparatus into which the film can be introduced in the form of an endless web and where it is possible in a simple manner to transpose it in the form of individual pieces on to the pin supports. According to the invention a transfer wheel is provided which, on stellate, radially displaceably arranged guides, there are retaining means for one film portion or blank each, whereby the retaining means in a radially internal position in the circumferential direction contiguously link up with one another. In a radially external transfer position, these guides have the same center-to-center distance from each other as the pin frames fitted on the conveyor. Hence, it is possible for the film portions or blanks to be placed on to the retaining means in an endless web, the retaining means being located in the internal position. The film blocks are separated from each other with the aid of a cutting device and subsequently are moved radially outwardly to the pin frames. This has the advantage that the film material can be disposed on to the retaining means in their radially internal position radially linked up with one another in the form of an endless web. The film is then secured to the retaining means in a suitable manner, (e.g. by suction force) and between the retaining means. The individual film portions or blanks, by a radially outwardly directed movement of the retaining means, are then fed to pin frames running synchronously with them.

The center-to-center distance of the retaining means in their radially internal position is preferably adjustable so that it will be possible to change the size of the film portion. As a rule, the pin frame according to the invention is capable of absorbing the deep-drawing stresses in the deep-drawing station. However, this does not exclude the possibility that additional devices are provided which ensure a close contact of the film with the rim of the container to be lined or the mold intended to accommodate the container.

In the following, the invention will be described in greater detail while reference is made to the accompanying drawings which illustrate advantageous embodiment examples. Of these FIG. 1 shows a diagrammatical part view of the apparatus with two revolving tables;

FIG. 2 shows a partial section through a deep drawing station;

FIGS. 3a and 3b show a perspective view of a pin frame;

FIG. 5 shows the deformation conditions along the film margin within the area of two pins, while

Figure 1:
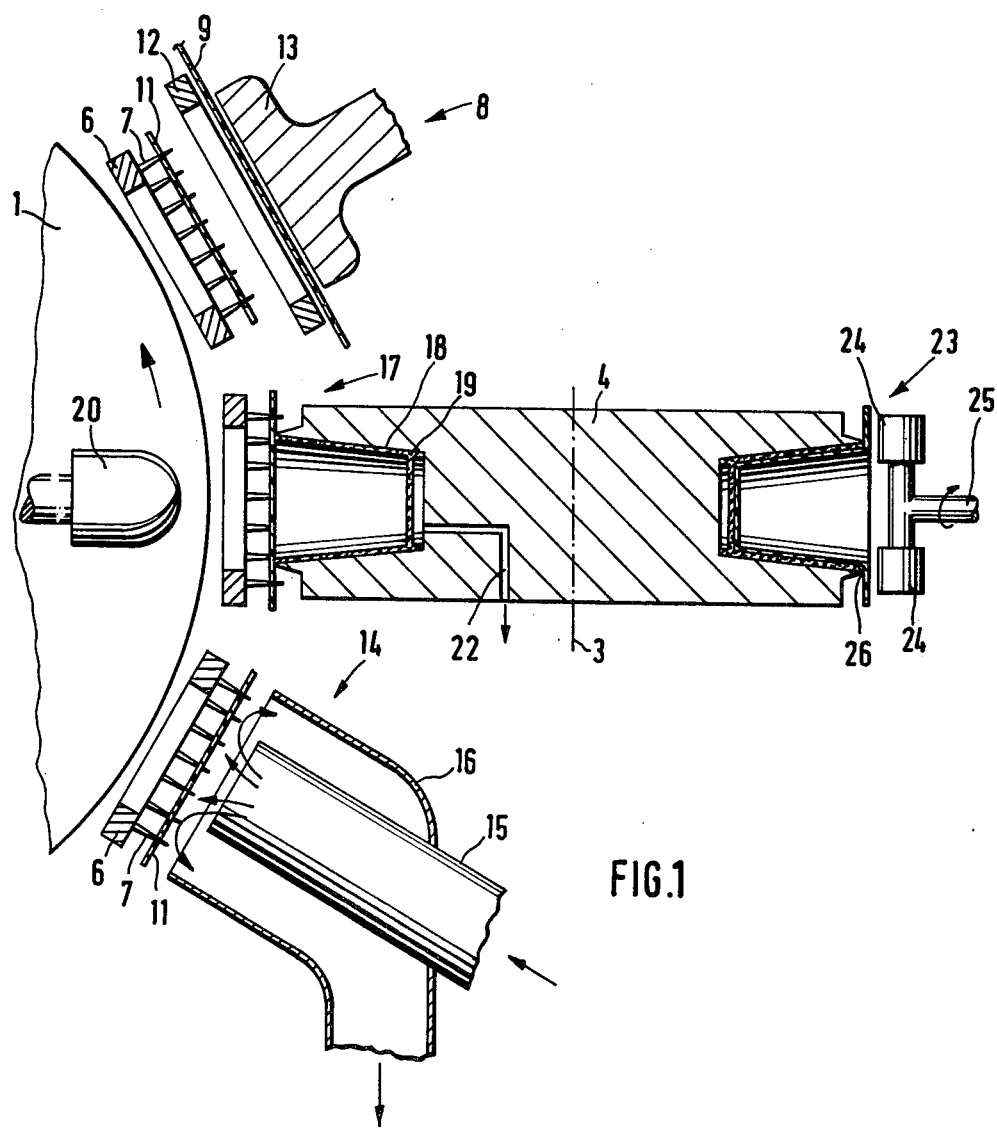

A first revolving table 1 rotates stepwise around a vertical axis (not shown) in the direction indicated by the arrow. A second revolving table 4 is likewise rotatable stepwise around a horizontal axis 3, located parallel to a tangent of table 1 in the deep drawing station. On revolving table 1, a plurality of frames 6 with pins 7 is arranged which rotate in conjunction with the said table. A plurality of mold recesses 18 are provided on revolving table 4. The point at which the revolving tables are closest to each other is the deep drawing station 17. The step-by-step motion of both revolving tables coincides to such an extent that one pin frame 6 each on revolving table 1 in the deep drawing station is located opposite to one mold provided in revolving table 4.

In an introduction station 8, film blanks 11 are punched out of a film web 9 that is running off a roll by means of a bottom die 12 and a top die 13 and, in the course of the punching movement, these blanks are impaled on the pins 7 of frame 6 oppositely located to the punching device.

A plurality of heating stations is provided on the circumference of the revolving table of which only the last heating station 14 is shown in FIG. 1. They are fitted with hot air jets 15 that blow hot air against film blank 11 in the manner indicated by arrows and, thereby, heat the same. If necessary, the waste hot air may be exhausted via a suction nozzle 16. Provision may also be made for a heat radiator in place of or in addition to the hot air jets. Provision has been made for so great a number of heating stations that the total of their heating times, even at a high operating rate of the apparatus, will be adequate to bring the film blanks 11 to deep drawing temperature.

After heating station 14, the hot film blank reaches the deep drawing station 17, where it comes to face a mold 18 with a paper cup 19 contained therein. The deep drawing station comprises a pre-drawing die 20 and a vacuum connection 22. The deep drawing process takes place in such a way that the pre-drawing die 20 first penetrates in the direction of the arrow into the mold or cup support and thereby brings the film to fit against the rim 21 of the cup support or cup. The annular face of the thin film blank 11 coming in contact with this rim cools off rapidly. In the course of the further movement of the pre-drawing die 20, the strong friction occurring in this area 21 reduces the transmission of the stresses acting in the film to the pins 7, which retain the film margin and thus contributes to the effect that the film does not tear off at the pins. FIG. 2 shows deep drawing station 17 more distinctly and in a somewhat modified form. Here two cups, if necessary, a further two cups, in an axial direction to revolving table 1, that is to say, a total of four cups, are simultaneously inserted into the deep-drawing station. The margin of the correspondingly larger film blank 11 is impaled on the pins. The deep drawing molds 18 are moved in an upward direction relative to this film, as shown in the drawing, until the cup rim 21 just touches the film. The movement is then arrested on the way upwards by means of a stop and not by the impingement on the thin film. Then the drawing process commences by the dies 20 first impinging upon the film, the dies 20 being mounted rigidly but adjustably in a die mounting 27. This die mounting 27 only touches the film above the rim 21 when the dies 20 have reached their lower dead center. The film is thereby drawn across rim 21 as well as across the intermediate edge present between the individual cups. As the film is very soft, only a very light pressure is exerted upon the rim 21 so that it does not adhere there. An adherence at this point is also rendered difficult by the fact that the film, due to the effect of the dies 20 as well as due to the compressed air subsequently entering into die mount 27, participates in the deformation process and, accordingly, executes a continuous relative motion to these rims. As already described in connection with FIG. 1, the friction created thereby does, however, absorb so much force that the stresses arriving on the impalement points are significantly reduced. When die mount 27 now impinges at this point it is intended to merely exert a slight force on the film so that this force, too, does not lead to any adherence. If necessary, the mold may be coated with polytetrafluoroethylene at the point where the film comes to rest. As soon as the die mounting has been placed on the mould rim or on the film, compressed air is introduced through aperture 28. Inside the die mounting, above the film, a gas pressure is created which brings about the desired deformation of the film. The die mounting is urged downwards by elastic force, the intensity of which is calculated in such a way that the pressure increase after the completed deformation slightly raises the die mounting 27 so as to allow the air between the die mounting and mold rim 21 to pass through to the outside, which here brings about an additional cooling of the film, whereby an adherence of the film is further prevented.

Holes 29 are provided in the molds which serve as a connection for compressed air or for the exhaustion of the air displaced from the container during the deep drawing process.

Figure 4:
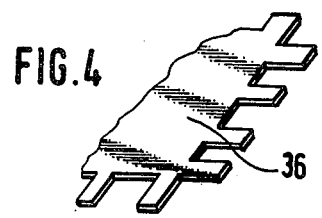
FIG. 4 shows a part of a stripping device forming part of the pin frame according to FIG. 3.

After the termination of the deep drawing process, the frame 6 with its pins 7 is separated from the film margin by a corresponding relative motion of the frame to the cup support or with the aid of a special stripping device 36 (FIG. 4). When the revolving tables subsequently continue their rotation, cup 19 with the film contained therein remains in the mold recess 18 on revolving table 4. It then reaches a station 23 in which the projecting film margin is cut off, for instance, by the combined action of two rollers 24 which rotate around a shaft 25 located perpendicularly to their axes of rotation, with the sharp edge 26 of the cup support. Revolving table 4 is equipped with two additional stations (not shown) which serve for the ejection of lined cups and the insertion of cups to be lined.

FIG. 3 illustrates a pin frame on a larger scale. By way of example, the frame 6 consists of solid aluminium and it is connected with the aid of means (not shown) to the conveyor of the apparatus, e.g. revolving table 1. Steel pins 7 are inserted with force fit into holes provided in the frame which, as far as material and size are concerned, may resemble grammophone needles and which project 10 to 15 mm over the frame surface. They are arranged in parallel fashion and are spaced approximately 10 mm apart.

In the area of frame sides 30 and 31, the inner edge of the frame is rectilinearily delimited. In contradistinction thereto the frame sides 32 & 33 illustrate another construction possibility in which the pins are fitted onto inner projections 34, between which, in each case, a recess 35 is provided through which an ejector comb is able to pass in order to strip the film margin off the pins. This ejector comb may be constructed along the circumference of an ejector disc 36 according to FIG. 4, which is controlled in such a way in relation to the frame that it is moved through the frame for the purpose of ejection.

Figure 5:
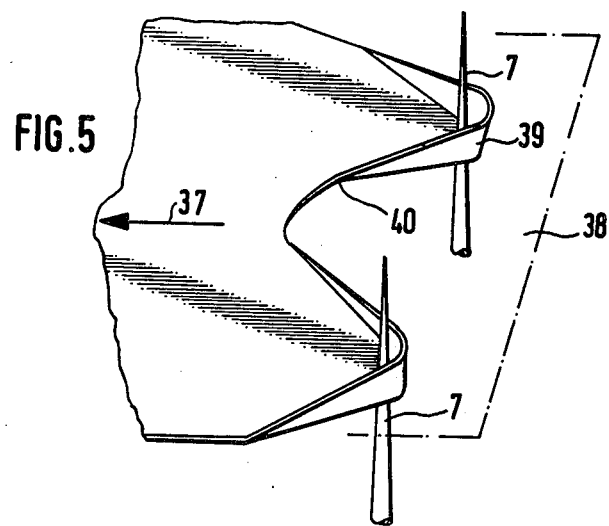

With the aid of FIG. 5 the behavior of a film margin is being illustrated which shows the film margin impaled on the pins 7, this margin extends transversely to a strong shrinkage stress direction which is indicated by the arrow 37. The original position of the film margin is indicated by hatching. The film margin remains in this position until the shrinkage stresses become liberated due to the heating. The film margin is heated in the same manner as the remainder of the film surface. In contrast to the inner area of the film blank, the film margin is able to deform unimpededly. Therefore, film margin begins first to contract inwardly and, should it so happen, to warp. It thereby approaches the pins 7. As the temperature rises further, the shrinkage stress begins to act also in the inner area of the film blank and to draw the film margin between the pins 7 arcuately towards the inside. Moreover, the areas of the film margin that are in the proximity of the pins come to rest against the pins in the form of a collar 39. This collar extends as far as into the arcade-like area between the pins and strengthens it. In addition, when regarding any portion 40 of the arcade-like area between the pins, it is realized that the stresses in the immediate vicinity of the collar can only proceed parallel to the same; transversely thereto the shrinkage stresses are compensated by an increase in the film thickness. This leads to a strengthening also in these areas, so that neither in the proximity of the pins nor between the pins there eixsts any risk of the film tearing at the edges, especially since the areas close to the pins mostly have a somewhat lower temperature and, thereby, a greater strength.

Figure 6:
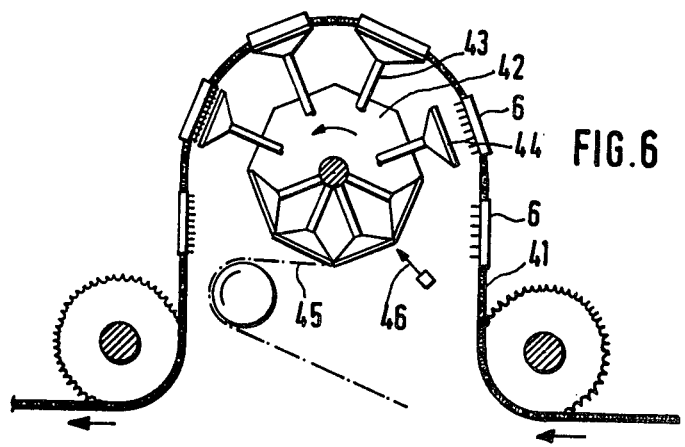
FIG. 6 shows a device for placing the film portions or blanks on to the pins.

FIG. 6 illustrates a device which may serve for the expeditious transfer of the film blanks advanced in a web. The frames 6 are fitted to a conveyor which, in the example shown, is indicated as an endless chain 41. It would also be possible instead thereof to employ a revolving table. By means of a sprocket wheel (not shown), chain 41 is conducted concentrically around a revolving table 42 which is equipped with eight guides 43 that are radially aligned at the same angular distance and at the extremities of which retraining means 44 for the film blanks are fitted. For the retention of the film blanks, they are, by way of example, fitted with suction devices controlled by timing means. The radial position of the retaining means is controlled in such a way at the guides 43 that they, in the bottom area of the revolving table as it appears in the drawing, are approximately in their radially innermost position, while in the upper area they are first swung out and then reach the frames 6 in their radially outermost position. Ultimately, they are again conducted radially towards the outside. In this context the expression "radial" is not to be taken to mean that the movement is bound to exactly follow a radius.

In their radially innermost position, the retaining means 44 essentially link up with one another in the circumferential direction. In this position, the film web 45, indicated in dot-dash lines, is placed upon them, and fixed on the retaining means e.g. by suction force. While the guides are still in their radially internal positions, the film blanks are separated from each other by means of a cutting device indicated by an arrow at 46.

In their radially outer position, the distance with respect to the center, the position and the circumferential speed of the retaining means 44 coincide with those of the frames 6 on conveyor 41. For this reason it is possible to transfer the film blanks unhurriedly from the retaining means to the frames 6 and also in a continuous operation. For this reason it is possible to attain a high rate of output which, makes the application of the invention particularly well-suited for mass production. Subsequently the film blanks retained by pin frames 6 are conducted by the conveyor 41 through a heating station and a deep drawing station, substantially as described in the foregoing. The width of the film blanks (in the circumferential direction) is contingent upon the spacing of the retaining means 44 in their radially innermost position which, in turn, depends on the radius. It is possible, therefore, to change it by a varying adjustment of the radius in the radially innermost position of the retaining means. For the purpose of adaption to different widths of the film blanks the retaining means may be interchangeable.

While a particular embodiment of the invention has been shown, it will be understood that the invention is not limited thereto, since many modifications may be made and will become apparent to those skilled in the art.

We claim:

1. In an apparatus for heating and deep drawing of thermoplastic film for lining air-permeable containers by lamination, said apparatus including
a mold for supporting a container to be lined by deep drawing the film therein,
means for holding the film,
means for heating the held film, and
means for deep drawing the film into the container, the improvement in said holding means for maintaining the film in a plane state, comprising
a plurality of pins arranged in parallel to each other and perpendicular with the plane of said film,
said pins piercing said film while holding the film,
a first set of said plurality of pins being located at a distance opposite a second set of said plurality of pins, thereby bounding the area to be deep drawn, said pins being transverse to the shrinkage direction of the film,
the distance between said first and second sets remaining constant while the film is being heated and deep drawn.

2. Apparatus in accordance with claim 1, wherein said first and second sets of said plurality of pins completely surround the area subject to being deep drawn.

3. Apparatus in accordance with claim 2, wherein said pins in said first and second sets are spaced apart transversely to the main shrinkage direction not in excess of 15 mm.

4. Apparatus in accordance with claim 1, wherein said holding means includes a frame to which is secured at least said first set of pins.

5. Apparatus in accordance with claim 4, wherein said pins and said frame are metallic and said pins are secured in said frame so that heat conducts therebetween.

6. Apparatus in accordance with claim 4, and including heat conduction means for the removal of heat from said pins.

7. Apparatus in accordance with claim 4 wherein said frame is provided with cut-out sections between said pins to permit passage of stripping teeth.

8. Apparatus in accordance with claim 4, and including means for forming a film blank from a film sheet dimensioned for holding by said pins and transferring said film blank onto said pins.

9. Apparatus in accordance with claim 8, wherein said holding means includes a plurality of frames and wherein said film sheet is a continuous web and is conveyor mounted, and wherein said forming and transferring means includes
a transfer wheel,
a plurality of outwardly displaceble guides mounted circumferentially contiguously on said transfer wheel, along which in their retracted positions is placed the continuous film web,
each of said guides having a retaining means at its extremity onto which said film blank is formed from the web and temporarily held during transfer of the blank,
said plurality of frames being conveyed past said transfer wheel at a uniform distance therefrom to permit uniform outward movement of said guides to permit transfer of said film blanks from said retaining means of said guides to the pins of respective ones of said frames.

10. Apparatus in accordance with claim 4, wherein said holding means includes a plurality of frames mounted on a first revolving table and wherein said mold is formed in a second revolving table into which are formed additional similar molds, and including driving means for said first and second tables to cause them to cross each other to cause correspondence of said frames with a container supporting mold during the respective deep drawing operations.

11. Apparatus in accordance with claim 9, wherein the retracted positions of said outwardly displaceable guides are adjustable.

12. Apparatus in accordance with claim 1, and including an endless conveyor and wherein said holding means is arranged with other similar holding means on said conveyor so as to pass said holding means through a film introduction station, a film heating station and a film deep drawing station.

* * * * *